June 27, 1939. E. J. HOUDRY 2,163,599
CONTROL OF HEAT EXCHANGE
Filed June 12, 1936 2 Sheets-Sheet 1

INVENTOR
Eugene J. Houdry
BY
Ira L. Nickerson
ATTORNEY

June 27, 1939.  E. J. HOUDRY  2,163,599
CONTROL OF HEAT EXCHANGE
Filed June 12, 1936  2 Sheets—Sheet 2
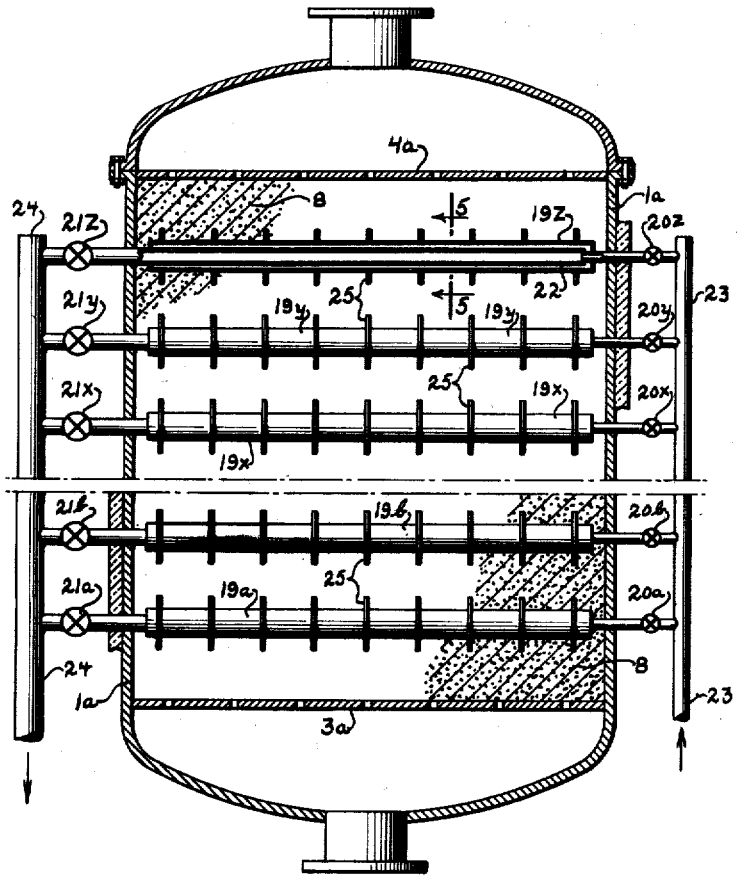
Fig.4.
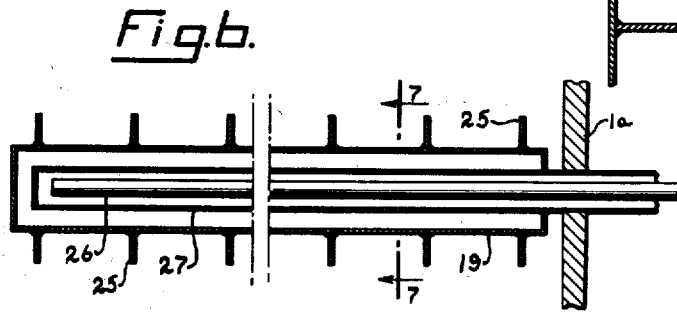
Fig.6.
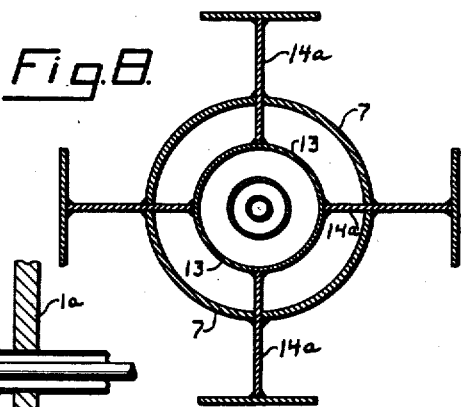
Fig.5.
Fig.7.
Fig.8.
INVENTOR
Eugene J Houdry
BY
Ira L. Nickerson
ATTORNEY Patented June 27, 1939

2,163,599

UNITED STATES PATENT OFFICE 2,163,599

CONTROL OF HEAT EXCHANGE

Eugene J. Houdry, Ardmore, Pa., assignor to Houdry Process Corporation, Dover, Del., a corporation of Delaware Application June 12, 1936, Serial No. 84,787

13 Claims. (Cl. 23—288)

This invention relates to the treatment of fluid materials in the presence of a contact mass which may be catalytically active or relatively inert or which may be absorbent, adsorbent, mere spreading material or a material which enters chemically into the reaction. More particularly it has to do with the temperature regulation and control of such a mass when it is, for example, disposed in the form of a deep layer or bed as illustrated in Patent No. 1,987,904, issued to me on January 15, 1935. My invention is especially applicable where strongly exothermic reactions, such as those involved in the catalytic synthesis of ammonia, of $SO_3$, in the regeneration or reactivation by oxidation of contact masses contaminated by coky, tarry and/or sulfurous deposits after use in the treatment or conversion of mineral oils, etc., are effected; or where strongly endothermic reactions, such as those involved in certain dehydrogenation or conversion treatments of hydrocarbons or other operations, are to be carried out; or where alternate endothermic and exothermic reactions, such as those met where there are alternate onstream and regeneration periods, are carried out.

One object of my invention is to control the temperature of the reaction all through the contact mass in a desired manner, either uniformly or in a stepwise or graduated manner. Another object is to avoid chilling or overheating of localized portions of the mass. Another object is to provide for the removal or addition of heat at a rapid rate and in large amounts. A further object is to remove products of regeneration or reaction from the reaction chamber containing the contact mass without greatly cooling them with cooling fluid in the case of a strongly exothermic reaction, or without greatly heating them with heating fluid in the case of a strongly endothermic reaction. Still another object is to provide flexible and easily controlled heat exchange means for accomplishing the above objects. Still other and more specific objects and advantages will appear from the description which follows.

A quick understanding of the invention may be had by reference to the illustrative embodiments thereof shown in the accompanying drawings in which:

Fig. 4 is an elevational view partly in section of a modified converter;

Fig. 5 is a sectional view of one of the heat exchange units shown in Fig. 4 and is taken on line 5—5 of Fig. 4;

Fig. 6 is an enlarged detailed sectional view of a modified form of the heat exchange unit shown in section in Fig. 4;

Fig. 7 is a sectional view taken on line 7—7 of Fig. 6; and

Fig. 8 shows in sectional plan view a modified construction of the type of unit shown in Fig. 3 and Fig. 2.

Figure 1:
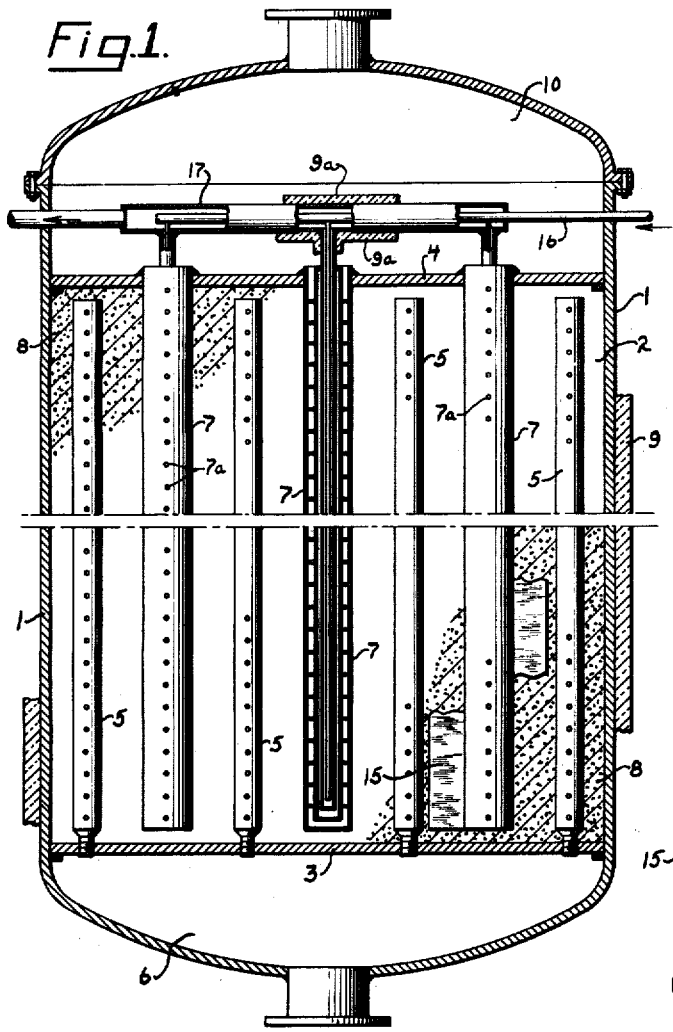
Fig. 1 is an elevational view, partly in section, of a converter providing a reaction chamber containing a contact mass having conduits, including heat exchange apparatus, embedded therein.

Referring more in detail to the drawings in the several figures of which like reference characters denote similar parts, 1 is a casing providing a reaction chamber 2 bounded at the bottom by tube sheet 3 and at the top by tube sheet 4. Perforated conduits 5, which are mounted in the lower tube sheet and communicate therethrough with manifolding chamber 6, may, for purposes of illustration, be considered as inlet or distributing conduits and perforated conduits 7, which are mounted in tube sheet 4, may be considered as outlet or withdrawal conduits. Contact mass 8 fills the reaction chamber 2 surrounding the conduits, the upper level of the bed of contact mass terminating adjacent tube sheet 4. Insulation 9 surrounds the casing 1.

Fluid reactants or the like may be introduced into manifolding chamber 6 and thence pass upwardly through conduits 5, which if desired may be of the double or nested variety, as shown in my aforesaid issued patent and in Patent No. 1,987,903 issued to me on January 15, 1935, and be dispersed therefrom substantially uniformly throughout all sections of the height or depth of the contact mass. Such fluids, for example in gaseous or vapor state, pass in contact with contact mass or catalyst 8 and then enter conduits 7 through the perforations or openings 7a and thereby pass from the reaction chamber into the upper manifolding chamber 10, from which latter the products of reaction or the like may pass from the converter.

During regeneration a regenerating medium such as air or oxygen mixed with inert gases in any desired proportion may be passed through the converter and in contact with the contact mass in the same path above described in connection with reactant fluids. That is, the regenerating medium may enter the reaction chamber through conduits 5 and may leave the reaction chamber through conduits 7. However, where desired, the reverse path of flow may be employed in either type of operation.

For the sake of a specific illustration, we may assume that during the on-stream period a mineral oil such as a petroleum fraction of the gas oil range is introduced in the vapor state into the reaction chamber 2 and products of reaction including a substantial proportion of components within the gasoline boiling range, are withdrawn from the reaction chamber. During such an operation, carbonaceous, sulphurous and/or other combustible contaminants become deposited on the contact mass and must be removed periodically, as by regeneration in situ, to restore the mass to the desired state of activity. This may be done by periodically passing air or other oxygen-containing gas through the bed or mass while the same is in place to burn away the deposits. The mass employed for such a purpose may consist of various materials and, for example, may comprise or be composed to substantial extent of blends of silica and alumina, hydrosilicates of alumina or other clayey or non-clayey materials, with or without the addition of other active materials such as metals or metal oxides or other metallic or non-metallic compounds. The contact mass may be in the form of fragmentary or preferably molded pieces.

In employing a contact mass or catalyst of the type above described it is important to maintain it in a state of desired high activity and to do this it is important to prevent overheating of the mass. Also, in the course of the conversion or on-stream reaction it is important to prevent over-cooling and to maintain the temperature within relatively narrow limits throughout all sections of the contact mass to obtain optimum conversion and a uniform deposit of contaminants. Likewise in the step of regeneration it is important to maintain the temperature of the mass substantially uniform throughout each unit volume thereof so that contaminants will be burned or eliminated from the mass rapidly, uniformly and simultaneously in all sections thereof, thereby to effect regeneration as expeditiously as possible, without overheating the mass. Hence it is important to avoid over-cooling as well as over-heating. Particularly during the regeneration step of this type of operation, large amounts of heat must be transferred in order to maintain the mass at a uniform or desired temperature. Since the regeneration reaction is highly exothermic, heat must be removed in large quantities and uniformly or substantially uniformly throughout all sections of the mass if, over a period of time, a progressive increase in temperature is to be avoided.

Heretofore it has been proposed to imbed cooling means directly in the mass so that the cooling or heat exchange medium was separated from the mass by a tube wall only. With this type of heat exchange, it has been necessary to exercise great care in the selection and use of the heat exchange medium, and even then, it was difficult to avoid chilling (or over-heating) of localized sections of the mass. Other apparatus has been employed for the temperature control of contact masses where the heat exchange medium was circulated in spacial relation and out of heat conducting relation with the mass, as indicated for example in certain copending applications including that of myself and R. C. Lassiat, Serial No. 728,544, filed June 1, 1934 (Patent No. 2,078,947, issued May 4, 1937). This latter type of heat transfer was advantageous in that it obviated localized over-cooling or over-heating of the mass, but the rate at which heat can be transferred in such an operation is dependent upon the areas of the heat radiating and heat absorbing surfaces and upon the maintenance of a large or fairly large temperature differential between those surfaces. Where large amounts of heat had to be transferred, as in the case of an exothermic regeneration, it was necessary to utilize large heat transfer surfaces and/or heat exchange or cooling medium which was low in temperature relative to the temperature of the out-going regeneration fumes and that obtaining within the contact mass. This resulted in a larger amount of cooling of the out-going gases, which was undesirable in many instances, and minimized their value as a source of energy. The present invention combines most of the advantages of these prior types of heat exchange and eliminates the major disadvantages of each; it provides for heat transfer by conduction and radiation, the heat transfer by conduction being restricted as shown. The number and size of the heat conducting links will control the proportionate amounts of heat that are transferred by conduction and by radiation. A rapid heat transfer is provided and, at the same time, substantial uniformity of temperature in all parts of the mass is maintained. It will also be seen that an extremely flexible heating or cooling system is provided, that is, it can readily be employed to maintain any desired temperature in the contact mass. Further, the temperature desired in the mass and the amount of heat required to be transferred are to a large degree independent of the temperature at which the cooling or heating medium is circulated, in operating the present invention.

It is an important accomplishment of the present invention, to withdraw products of regeneration from the reaction chamber during regeneration and/or products of reaction therefrom during the onstream or reaction period without the same being greatly changed in temperature (i. e. cooled or heated as the case may be) due to the carrying out of the desired heat exchange. One reason for this is that it is often desired to recover the energy present in the regeneration fumes or gaseous products of reaction. Also it is desired to be able to effect the large or necessary amount of heat exchange in a minimum time and with a minimum number or size of heat exchange units and yet substantially to prevent over-heating or excessive cooling of the various portions of the contact mass.

The heat exchange unit or apparatus of the type shown, for example, located within conduits 1 is an important part of this invention and involves a type and system of heat exchange which is an important aspect of it. This heat exchange unit or apparatus can be understood by reference to Fig. 2. A heat exchange fluid such as water, brine, oil, etc., depending upon temperature conditions involved, may be introduced through internal conduit 11 which opens at its lower end into surrounding, concentric tube 12. Surrounding and spaced from tube 12 is a concentric tube 13 providing a closed annular chamber between tubes 13 and 12. This sealed chamber may be filled or partially filled with a heat conducting substance such as mercury, lead, various fusible alloys, diphenyl, certain conducting mixtures of fusible salts or other materials, depending upon what the apparatus is to be used for and the temperatures which will be encountered. Tube 13 is connected at approximately uniform and frequently spaced intervals in heat conducting relationship with conduits 7 by heat conducting links 14. As illustrated, these links 14 may comprise short rods and each may be screwed into a nut which is welded onto the outer surface of tube 13 and may be welded at its other end to the edges of an opening in tube 7, or the heat conducting links may be connected in any other desired or suitable manner. However, these links may consist of metal straps, elongated fin-like members, angle bars, or other shaped members, as desired. The size of each of these links may be controlled in any desired manner so as to restrict the passage of heat by conduction to any extent or proportion desired or necessary in arriving at optimum conditions of heat transfer and in promoting uniformity of temperature throughout the contact mass. Fins 15, which are connected in heat conducting relationship with conduits 7, radiate from such conduits into the surrounding contact mass.

Ducts 11 are fed with water or other heat exchange fluid by tubular manifold 16 and outgoing heat exchange fluid is carried away by tubular manifold 17. The latter tube is shown concentric with tube 16 although any other suitable arrangement is contemplated. Tube 17 and other parts of the heat exchange manifold within the manifolding chamber 10 are covered with insulation 9a to prevent heat exchange between heat exchange fluid and products of reaction or regeneration while within the manifolding chamber 10.

Figure 2:
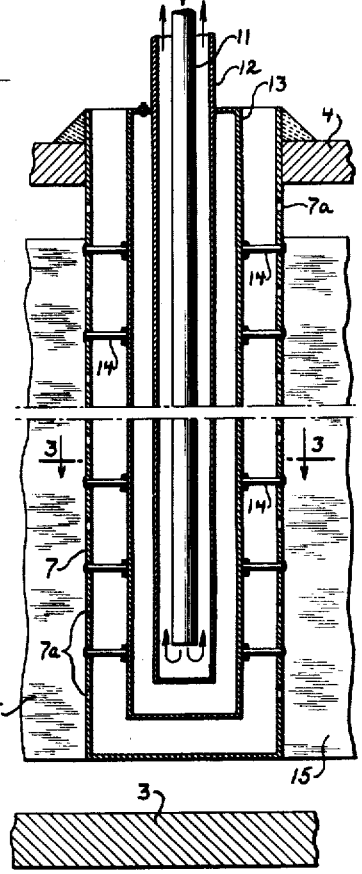
Fig. 2 is an enlarged detail view of one of the conduit units shown in Fig. 1.
Figure 3:
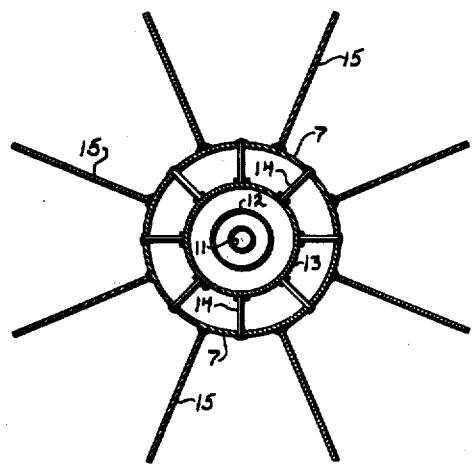
Fig. 3 is a plan or transverse sectional view taken on line 3—3 of Fig. 2.

While conduits 7 are shown with perforations or openings 7a spaced from each other along the length thereof, in modified types of apparatus where, for example, one of the tube sheets is perforated to permit the passage of gases between the reaction chamber and the manifolding chamber, it is also contemplated that tubes 7 may be provided without any openings or perforations therein. In such event tube 7 is simply the largest concentric tube in the heat exchange unit and heat exchange between the contact mass and the heat exchange fluid is effected by conduction and radiation in proportions dependent upon the relative size and frequency of the heat conducting links 14 between tubes 7 and 13 and upon the temperature differential which is maintained between the wall of tube 7 and the confined annulus of mercury, diphenyl, or other liquid substance. This confined annulus of mercury or other substance acts as a heat cushion or heat storage buffer between the heating or cooling medium and the contact mass and gives highly desirable flexibility of temperature control of the contact mass. Also the annulus of buffer liquid, especially where it is not of high heat conductivity, has convection currents set up in it which act to iron out longitudinal non-uniformity of temperatures.

Where the heat conducting links between tubes 7 and 13 are continuous fins of large or fairly large cross-sections, the temperature differential between the tubes 7 and 13 may be as low as 25° F., or of that order, and still provide sufficient heat transfer for many operations; whereas when it is desired to effect a higher proportion of heat transfer by radiation and the heat conductors between tubes 7 and 13 are of the general type shown in Fig. 2, for example, the temperature differential between tubes 7 and 13 (i. e. between the tube wall which is in contact with the contact material and the wall which bounds the outer circumference of the confined annulus of liquid or heat storage buffer) may be of 100° F. or 150° F. or up to differences of the order of 200° F.

The circulating heat exchange fluid may be brought in contact with the inner wall 12 of the confined areas of liquid or buffer in any desired manner. For example the fresh heat exchange fluid may be directed in heat exchange relation with tube 12 at several points along its length where desirable. Also the heat exchange fluid may be circulated continuously or intermittently, but preferably continuously. Further, it may vary in temperature but substantial variations in temperature are preferably accompanied by corresponding adjustments in the rate of its circulation.

In place of having a double tube for the passage of a heat exchange fluid such as water, as illustrated by tubes 11 and 12 of the drawings; a single tube extending at one end through the top tube sheet and at the other end through the bottom tube sheet and provided with a slip joint at one tube sheet is contemplated as a substitute for the structure shown. In such modification an inlet heat exchange manifold would be provided in one manifolding chamber and an outlet heat exchange manifold would be provided in the opposite manifolding chamber.

In certain reactions it is desirable to control the temperature of a contact mass in a gradated or graduated manner. For example, it is desirable in some reactions to have the temperature of the section of the mass with which fluids first come into contact at a lower temperature than the remainder of the mass and to have each successive layer of the mass at a progressively higher temperature in the direction in which gases or vapors pass therethrough. Again, in certain reactions the degree of exothermic heat or endothermic heat given up or absorbed progressively changes as the vapors or gases pass through the mass. In certain cases of this latter type it is frequently desired to maintain each successive section of the reaction mass at the same temperature despite the fact that a different amount of heat is given up or absorbed in the reaction which is taking place. Hence, it is advantageous to effect dissimilar amounts of heat exchange in different sections of the mass to approximate or arrive at such desired results.

The apparatus illustrated in Fig. 4 is particularly designed to be used in various situations including the two just above described. The amount of heat exchange which is effected by units 19a, 19b, 19x, 19y and 19z will depend upon the control of valves 20a and 21a, 20b and 21b, etc. While only a single tube appears in Fig. 4 of the drawings at each level in converter 1a, it will of course be obvious that a plurality of such heat exchange units is contemplated at each level. Partition members or sheets 3a and 4a are shown perforated and reactant fluids or regeneration mediums may pass either upwardly or downwardly through the reaction chamber, as desired. Each of the members 19a, 19b, etc., has a central tube 22 through which a heat exchange fluid such as water or the like under any desired pressure, may be passed, the heat exchange fluid being supplied by manifold header 23 and being exhausted into manifold header 24. Each of the units 19a, 19b, etc. is provided with fin members 25 which, for example, may be in the form of discs, stars, or other desired shape and are preferably positioned in a substantially vertical plane, although this is not essential. Within the annular chamber between each of tubes 22 and the respective surrounding tube 19a or 19b or 19x, etc. a heat conducting substance such as mercury, lead, diphenyl, etc. depending upon the temperature conditions to be encountered and the type of heat exchange desired, may be confined.

In place of having a single tube 22 for conducting water or other heat exchange fluid as shown in Fig. 4, a modified form of heat exchange unit such as shown in Fig. 6 having nested tubes 26 and 27 or other construction may be employed in lieu thereof so that the heat exchange medium may be circulated within the reaction chamber without the heat exchange unit being connected to the casing 1a at more than one point. This type of construction becomes important where the temperature variations which take place throughout the apparatus are of such magnitude as to make problems of relative expansion and contraction of different parts of the apparatus a matter for serious consideration.

In some cases it is more simple to make up the composite tube with the heat exchange apparatus therewithin illustrated in Fig. 2, with continuous fin-like members from the tube 13 to and through the walls of conduit 7 without interruption. Where this type of construction is employed, as illustrated in Fig. 8 of the drawings, the fin members may be welded or otherwise joined in heat conducting relation to the tubes 13 and then the tubes 7 may be built up from sections or quadrants, each quadrant being welded along the length of each of its longitudinal edges to the continuous fin members 14a, as shown.

It will be seen where heat transfer units such as illustrated in either Fig. 1 or Fig. 4 are employed that uniform or desired temperature control is independent of variations in the temperature of the circulating heat exchange medium. A layer or annulus of mercury, lead, etc. intervenes between the circulating heat exchange medium and the heat conducting links and/or fins which extend into the contact mass. It is the control of the temperature of this layer or annulus of mercury etc. which is important. This can be done regardless of wide variations in the temperature at which the circulating heat exchange medium is introduced so long as the rate of circulation is lowered as the temperature is decreased and raised as the temperature is increased, in the case of an exothermic reaction; and raised as the temperature is decreased and lowered as the temperature is increased, in the case of an endothermic reaction.

While my method and apparatus for effecting controlled or uniform heat exchange partly by conduction (especially restricted conduction) and partly by radiation has been described in connection with certain specific embodiments thereof and certain adaptations, other embodiments and other uses or adaptations will readily occur to those skilled in this art in view of the above description and such obvious embodiments and adaptations are contemplated as part of this invention and come within the scope of the appended claims.

What I claim is:

1. In a converter having a casing providing a reaction chamber and a bed or body of contact or catalytic material within said reaction chamber, a heat exchange member embedded in said contact material and adapted to effect and control heat exchange therewith which comprises a hollow tubular member, a tubular heat exchange unit within said tubular member and spaced from the inner walls of the latter to provide an approximately annular dead space between said hollow tubular member and said tubular heat exchange unit and a plurality of heat conducting members of restricted heat conductivity arranged around the perimeter of said tubular heat exchange unit and throughout its length and joining said unit in restricted heat conducting relationship with said hollow tubular member, so that heat transfer between said heat exchange unit and the walls of said hollow tubular member is effected partly by conduction and partly by radiation.

2. In a converter having a casing providing a reaction chamber bounded at either end by a wall and adapted to contain a bed of contact material, a hollow tubular member extending within said reaction chamber and a tubular heat exchange unit within said tubular member and extending throughout substantially the entire length thereof, said tubular heat exchange unit comprising an outer closed annular chamber containing a liquid capable of acting as a heat storage buffer and means for circulating a heat exchange fluid through a passageway substantially surrounded by said closed annular chamber and in heat conducting relation with the inner wall of the latter, the exterior wall of said closed annular chamber being joined to the aforesaid tubular member by a plurality of heat conducting members arranged around the perimeter and throughout the length of the said heat exchange unit, thereby to provide for heat transfer between said heat exchange unit and said tubular member partly by conduction and partly by radiation.

3. In a converter having a casing providing a reaction chamber bounded at either end by a wall and adapted to contain a bed of contact material, a hollow tubular member extending within said reaction chamber and a tubular heat exchange unit within said tubular member and extending throughout substantially the entire length thereof, said tubular heat exchange unit comprising an outer closed annular chamber containing a liquid capable of acting as a heat storage buffer and a tubular duct surrounded by said annular chamber and spaced from the inner walls thereof, said duct being open at both ends and the space intervening between said duct and the aforesaid annular chamber having an inlet or outlet opening adjacent one end thereof, thereby to provide a nested conduit assembly centrally of said annular chamber, and the exterior wall of said closed annular chamber being joined to the aforesaid tubular member by a plurality of heat conducting members arranged around the perimeter and throughout the length of the said heat exchange unit, thereby to provide for heat transfer between said heat exchange unit and said tubular member partly by conduction and partly by radiation.

4. In a converter having a casing providing a reaction chamber bounded at either end by a wall and containing a body or bed of contact material, a hollow tubular member extending within said reaction chamber and embedded in said contact material, said converter being constructed to provide for passage of reactant fluids into and through said reaction chamber and for withdrawal of fluid products therefrom, a tubular heat exchange unit extending within and spaced from the inner walls of said tubular member, said heat exchange unit being sealed from communication with said reaction chamber and being joined to said tubular member by a plurality of heat conducting members of restricted cross-section and of restricted heat conductivity, arranged around the perimeter and throughout the length of the said heat exchange unit so as to provide for heat transfer between said heat exchange unit and said tubular member partly by conduction and partly by radiation, said hollow tubular member being arranged with relation to other portions of the converter and constructed so that there can be substantially no passage of fluid through the approximately annular space provided within said hollow tubular member surrounding the said tubular heat exchange unit located therewithin, and means for introducing fluid into and means for withdrawing fluid from said tubular heat exchange unit.

5. In a converter having a casing providing a reaction chamber and a bed or body of contact or catalytic material within said reaction chamber, a heat exchange member embedded in said contact material and adapted to effect and control heat exchange therewith which comprises a hollow tubular member, a tubular heat exchange unit within said tubular member and spaced from the inner walls of the latter to provide an approximately annular dead space between said hollow tubular member and said tubular heat exchange unit, a plurality of heat conducting members of restricted heat conductivity arranged around the perimeter of said tubular heat exchange unit and throughout its length and joining said unit in restricted heat conducting relationship with said hollow tubular member so that heat transfer between said heat exchange unit and the walls of said hollow tubular member is effected partly by conduction and partly by radiation, and a plurality of fins of good heat conductivity joined to the outer wall of said hollow tubular member and radiating outwardly therefrom into said contact material.

6. In a converter providing a reaction chamber bounded at either end by a wall, a contact mass within said chamber, a multiple nested tubular unit extending into said reaction chamber and embedded in said contact mass and being mounted in one of said walls so as to communicate therethrough, said tubular unit comprising a closed annular chamber adapted to contain a fluid as a heat storage buffer, means for circulating a heat exchange fluid adjacent the inner wall of said closed annular chamber, fin members joining the outer wall of said annular chamber in heat conducting relation with interior sections of said contact mass, and sections surrounding and spaced from the said outer wall of said annular chamber and being joined to said fin members to form a built-up tubular duct adapted to provide an annular passageway exterior to and surrounding said annular chamber and to maintain the said contact mass in spaced relation with the latter, the said fin members extending outwardly beyond the said tubular sections.

7. In a converter having a casing providing a reaction chamber bounded at either end by a wall, a bed of contact material within said chamber, passages in one of said walls for the introduction of reactant fluid into said chamber in contact with said material, passages in the opposite of said walls for withdrawing products of reaction from said chamber, a plurality of elongated tubular heat exchange units extending into said reaction chamber in approximately parallel relation with the aforesaid walls, inlet and outlet manifold headers for the introduction and withdrawal of heat exchange fluid, valved ducts connecting said tubular heat exchange units with said manifold headers, each of said ducts connecting one or more of said heat exchange units which are located in proximate relation, the apparatus being thereby adapted to control as desired the flow of heat exchange fluid at various sections intermediate the two walls of the reaction chamber to maintain each section of the contact mass at desired temperature independently of other sections, each of said elongated heat exchange units comprising two concentric tubular members of different sizes to provide the inner and outer walls of a closed annular chamber containing a fluid medium and being adapted to permit the circulation of fluid through a passageway substantially surrounded by said annular chamber and in heat exchange relation with the inner wall thereof.

8. Apparatus as described in claim 7 in which the casing providing the reaction chamber is in substantially upright position, the walls bounding either end of the reaction chamber are disposed in substantially horizontal position, the tubular heat exchange units are disposed in substantially horizontal position within said bed, and disc-like fins are joined to the outer wall of the annular chamber of each of said tubular heat exchange units and extend in an approximately vertical plane into said bed.

9. Apparatus for effecting a contact treatment of fluids which comprises a casing providing a reaction chamber bounded at each end by a wall, a contact mass within said chamber, a plurality of inlet and outlet conduits, having perforations or openings along the length of each, extending within said reaction chamber in interspersed and symmetrical arrangement and substantially parallel relation and embedded within said contact mass, each of the groups of conduits (i. e., inlet conduits and outlet conduits) communicating through a wall of said reaction chamber with an adjacent manifold, and each of the conduits of the group of outlet conduits comprising an outer perforate tube, an imperforate tube of substantially smaller circumference than said perforate tube and located within the latter, thereby providing an annular passageway between said tubes for the outlet or withdrawal of fluid products of reaction, fins radiating outwardly from said perforate tube into said contact mass, a plurality of heat conducting links of restricted heat conductivity joining said imperforate tube to said perforate tube, heat exchange means within said imperforate conduit providing concentric but non-communicating bodies of static and of circulated fluid, thereby effecting heat transfer between said imperforate tube and said perforate tube partly by conduction and partly by radiation.

10. A heat exchange member adapted to be embedded in a contact mass and to effect and control heat exchange therewith which comprises two concentric tubular members of different sizes to provide the inner and outer walls of a closed annular chamber, a fluid medium of good heat acting as a heat storage buffer within said annular chamber, means for circulating a heat exchange fluid along and in heat exchange relationship with the said inner wall of said annular chamber, a larger tubular member surrounding the aforesaid tubular members and spaced from the said outer wall of said annular chamber, heat conducting members joining the said outer wall of said annular chamber in heat conducting relationship with said larger tubular member, said heat conducting members being arranged around and throughout the length of the said outer wall of said annular chamber.

11. A heat exchange member adapted to be embedded in a contact mass and to effect and control heat exchange therewith which comprises two concentric tubular members of different sizes to provide the inner and outer walls of a closed annular chamber, a heat-conductive fluid medium within said annular chamber, means for circulating a heat exchange fluid along and in heat exchange relationship with the said inner wall of said annular chamber, a larger tubular member surrounding the aforesaid tubular members and spaced from the said outer wall of said annular chamber to provide a passageway therebetween, said larger tubular member having perforations or openings spaced from each other throughout the length thereof to provide for the distribution or collection of fluid, heat conducting members joining the said outer wall of said annular chamber in heat conducting relationship with said larger tubular member, said heat conducting members being arranged approximately symmetrically around and throughout the length of the said outer wall of said annular chamber, and fin members extending outwardly from said larger tubular member.

12. A fluid venting or distributing unit adapted for use within a bed of contact material which comprises a perforated conduit, a second conduit within said perforated conduit, said second conduit being of substantially smaller dimensions than said perforated conduit and being spaced from the walls of the latter to provide an approximately annular passageway therebetween and said second conduit being substantially imperforate and sealed from communication with said annular passageway, means providing separate and non-communicating bodies of static and of circulated heat exchange fluid within said second conduit, and heat conducting elements of restricted cross-section and heat conductivity joining the walls of said second conduit with the walls of said perforated conduit.

13. A fluid venting or distributing unit adapted for use within a bed of contact material which comprises a perforated conduit, a second conduit within said perforated conduit, said second conduit being of substantially smaller dimensions than said perforated conduit and being spaced from the walls of the latter to provide an approximately annular passageway therebetween and said second conduit being substantially imperforate and sealed from communication with said annular passageway, means providing substantially coextensive but separate and non-communicating bodies of static and of circulated heat exchange fluid within said second conduit, heat conducting elements joining the walls of said second conduit with the walls of said perforated conduit and fin members radiating from the outer walls of said perforated conduit and adapted to extend into and be embedded in a bed of contact material.

EUGENE J. HOUDRY.

CERTIFICATE OF CORRECTION.

Patent No. 2,163,599. June 27, 1939.

EUGENE J. HOUDRY.

It is hereby certified that error appears in the printed specification of the above numbered patent requiring correction as follows: Page 5, second column, line 69, claim 10, after the word "heat" first occurrence, insert conductivity; and that the said Letters Patent should be read with this correction therein that the same may conform to the record of the case in the Patent Office.

Signed and sealed this 1st day of August, A. D. 1939.

(Seal)

Henry Van Arsdale,
Acting Commissioner of Patents.

heat conducting members joining the said outer wall of said annular chamber in heat conducting relationship with said larger tubular member, said heat conducting members being arranged around and throughout the length of the said outer wall of said annular chamber.

11. A heat exchange member adapted to be embedded in a contact mass and to effect and control heat exchange therewith which comprises two concentric tubular members of different sizes to provide the inner and outer walls of a closed annular chamber, a heat-conductive fluid medium within said annular chamber, means for circulating a heat exchange fluid along and in heat exchange relationship with the said inner wall of said annular chamber, a larger tubular member surrounding the aforesaid tubular members and spaced from the said outer wall of said annular chamber to provide a passageway therebetween, said larger tubular member having perforations or openings spaced from each other throughout the length thereof to provide for the distribution or collection of fluid, heat conducting members joining the said outer wall of said annular chamber in heat conducting relationship with said larger tubular member, said heat conducting members being arranged approximately symmetrically around and throughout the length of the said outer wall of said annular chamber, and fin members extending outwardly from said larger tubular member.

12. A fluid venting or distributing unit adapted for use within a bed of contact material which comprises a perforated conduit, a second conduit within said perforated conduit, said second conduit being of substantially smaller dimensions than said perforated conduit and being spaced from the walls of the latter to provide an approximately annular passageway therebetween and said second conduit being substantially imperforate and sealed from communication with said annular passageway, means providing separate and non-communicating bodies of static and of circulated heat exchange fluid within said second conduit, and heat conducting elements of restricted cross-section and heat conductivity joining the walls of said second conduit with the walls of said perforated conduit.

13. A fluid venting or distributing unit adapted for use within a bed of contact material which comprises a perforated conduit, a second conduit within said perforated conduit, said second conduit being of substantially smaller dimensions than said perforated conduit and being spaced from the walls of the latter to provide an approximately annular passageway therebetween and said second conduit being substantially imperforate and sealed from communication with said annular passageway, means providing substantially coextensive but separate and non-communicating bodies of static and of circulated heat exchange fluid within said second conduit, heat conducting elements joining the walls of said second conduit with the walls of said perforated conduit and fin members radiating from the outer walls of said perforated conduit and adapted to extend into and be embedded in a bed of contact material.

EUGENE J. HOUDRY.

CERTIFICATE OF CORRECTION.

Patent No. 2,163,599. June 27, 1939.

EUGENE J. HOUDRY.

It is hereby certified that error appears in the printed specification of the above numbered patent requiring correction as follows: Page 5, second column, line 69, claim 10, after the word "heat" first occurrence, insert conductivity; and that the said Letters Patent should be read with this correction therein that the same may conform to the record of the case in the Patent Office.

Signed and sealed this 1st day of August, A. D. 1939.

Henry Van Arsdale,
Acting Commissioner of Patents.

(Seal)